US007599547B2

(12) United States Patent
Sun et al.

(10) Patent No.: US 7,599,547 B2
(45) Date of Patent: Oct. 6, 2009

(54) SYMMETRIC STEREO MODEL FOR HANDLING OCCLUSION

(75) Inventors: Jian Sun, Beijing (CN); Yin Li, Beijing (CN); Sing Bing Kang, Redmond, WA (US); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 680 days.

(21) Appl. No.: 11/289,907

(22) Filed: Nov. 30, 2005

(65) Prior Publication Data

US 2007/0122028 A1    May 31, 2007

(51) Int. Cl.
*G06K 9/00* (2006.01)
*G06T 15/00* (2006.01)
*G01C 3/14* (2006.01)

(52) U.S. Cl. .......................... 382/154; 345/419; 356/12
(58) Field of Classification Search ................. 382/154; 345/419–427; 356/12
See application file for complete search history.

(56) References Cited

U.S. PATENT DOCUMENTS

| 7,330,593 B2 * | 2/2008 | Hong et al. ................. 382/209 |
| 2004/0240725 A1 * | 12/2004 | Xu et al. ..................... 382/154 |

OTHER PUBLICATIONS

Zitnick et al. ("A Cooperative Algorithm for Stereo Matching and Occlusion Detection" IEEE Trans. Pattern Analysis and Machine Intelligence, vol. 22, No. 7, Jul. 2000.).*
P. Belhumeur, "A Bayesian Approach to Binocular Stereopsis," IJCV, 1996, pp. 237-260, vol. 19, Issue 3.

M. Bleyer and M. Gelautz, "A Layered Stereo Algorithm Using Image Segmentation and Global Visibility Constraints," ICIP, 2004, pp. 2997-3000.
A.F. Bobick and S.S. Intille, "Large Occlusion Stereo," IJCV, 1999, pp. 1-20, vol. 33, Issue 3.
Y. Boykov, O. Veksler, and R. Zabih, "Fast Approximate Energy Minimization Via Graph Cuts," PAMI, Nov. 2001, pp. 1222-1239, vol. 23, No. 11.
D. Comaniciu and P. Meer, "Mean Shift: A Robust Approach Toward Feature Space Analysis," PAMI, May 2002, pp. 603-619, vol. 24, No. 5.
I.J. Cox, S.L. Hingorani, S.B. Rao, and B.M. Maggs, "A Maximum-Likelihood Stereo Algorithm," CVIU, May 1996, pp. 542-567, vol. 63, Issue 3.
G. Egnal and R.P. Wildes, "Detecting Binocular Half-Occlusions: Empirical Comparisons of Five Approaches," PAMI, Aug. 2002, pp. 1127-1133, vol. 24, Issue 8.
P.F. Felzenszwalb and D.P. Huttenlocher, "Efficient Belief Propagation for Early Vision," CVPR, 2004, pp. 261-268, vol. I.

(Continued)

*Primary Examiner*—Brian P Werner
*Assistant Examiner*—Randolph Chu
(74) *Attorney, Agent, or Firm*—Lee & Hayes, PLLC

(57) ABSTRACT

The present symmetric stereo matching technique provides a method for iteratively estimating a minimum energy for occlusion and disparity using belief propagation. The minimum energy is based on an energy minimization framework in which a visibility constraint is embedded. By embedding the visibility constraint, the present symmetric stereo matching technique treats both images equally, instead of treating one as a reference image. The visibility constraint ensures that occlusion in one view and the disparity in another view are consistent.

18 Claims, 6 Drawing Sheets

OTHER PUBLICATIONS

D. Geiger, B. Ladendorf, and A. Yuille, "Occlusions and Binocular Stereo," IJCV, 1995, pp. 211-226, vol. 14, Issue 3.

L. Hong and G. Chen, "Segment-based Stereo Matching Using Graph Cuts," CVPR, 2004, pp. 74-81, vol. I.

H. Ishikawa and D. Geiger, "Occlusions, Discontinuities, and Epipolar Lines in Stereo," ECCV, 1998, pp. 232-249, vol. 1.

V. Kolmogorov and R. Zabih, "Computing Visual Correspondence with Occlusions Using Graph Cuts," ICCV, 2001, pp. 508-515.

V. Kolmogorov and R. Zabih, "Multi-camera Scene Reconstruction via Graph Cuts," ECCV, 2002, pp. 82-96, vol. III.

M. Lin, "Surfaces With Occlusions from Layered Stereo," Ph.D. thesis, 2002, Stanford University.

D. Marr and T.A. Poggio, "Cooperative Computation of Stereo Disparity," Science, 1976, pp. 283-287, vol. 194, No. 4262.

A.S. Ogale and Y. Aloimonos, "Stereo correspondence with slanted surfaces: critical implications of horizontal slant," CVPR, Jun. 2004, pp. 568-573, vol. I.

D. Scharstein and R. Szeliski, "A Taxonomy and Evaluation of Dense Two-Frame Stereo Correspondence Algorithms," IJCV, 2002, pp. 7-42, vol. 47, No. 1.

C. Strecha, R. Fransens, and L. Van Gool, "Wide-baseline Stereo from Multiple Views: a Probabilistic Account," CVPR, 2004, pp. 552-559, vol. I.

J. Sun, H.Y. Shum, and N.N. Zheng, "Stereo Matching Using Belief Propagation," ECCV, 2002, pp. 510-524, vol. II.

H. Tao, H.S. Sawhney, and R. Kumar, "A Global Matching Framework for Stereo Computation," ICCV, 2001, pp. 532-539, vol. I.

M.F. Tappen and W.T. Freeman, "Comparison of Graph Cuts with Belief Propagation for Stereo, using Identical MRF Parameters," ICCV, 2003, pp. 900-906, vol. II.

Y. Wei and L. Quan, "Region-Based Progressive Stereo Matching," CVPR, 2004, pp. 106-113, vol. I.

C. Zitnick and T. Kanade, "A Cooperative Algorithm for Stereo Matching and Occlusion Detection," PAMI, Jul. 2000, pp. 675-684, vol. 22, No. 7.

C.V. Stewart, "Robust Parameter Estimation in Computer Vision," SIAM Review, 1999, pp. 1-32, vol. 41, Issue 3.

* cited by examiner

| $\lambda$ | $T$ | $\eta_o$ | $\sigma_d$ | $e_d$ | $\beta_w$ | $\beta_o$ | $\gamma$ |
|---|---|---|---|---|---|---|---|
| Automatic | 2 | 2.5 | 4.0 | 0.01 | 4.0 | 1.4 | 2.0 |

$$E_{O_L} \approx \sum_s ((1-o_s)\rho_d(F(s,d_s,I)) + o_s\eta_o)$$
$$+ \sum_s \beta_w |o_s - W_L(s; D_R)| + \sum_{s,t \in C} \beta_o |o_s - o_t|.$$

630

$$E_{D_L} \approx \sum_{s \notin \hat{O}} \rho_d(F(s,d_s,I)) + \sum_s \beta_w O_R(x_s + d_s, y_s) + \sum_{s,t \in C \setminus B} \rho_d(d_s, d_t).$$

*Fig. 6*

SYMMETRIC STEREO MODEL FOR HANDLING OCCLUSION

BACKGROUND

Over the past few years there have been several advances in the area of computer vision. One area that has seen significant advances is stereo matching. In the past, real-time stereo matching techniques required special purpose hardware. Now, there are stereo matching techniques that can be implemented on regular personal computers.

In overview, stereo matching involves determining a disparity between one or more views of the same scene obtained from different viewpoints (e.g., left-eye viewpoint and right-eye viewpoint). When there are only two viewpoints, stereo matching is referred to as two-frame stereo matching. In general, disparity refers to the difference in location of corresponding features in the scene as seen by the different viewpoints. The most common type of disparity is horizontal disparity, but vertical disparity is possible if the eyes are verged.

When determining the disparity, stereo matching techniques must handle various problems, such as noise, textureless regions, depth discontinuity, and occlusion. For example, the stereo matching technique needs to handle the noise caused by unavoidable light variations, image blurring, and sensor noise during image formation. In addition, the techniques need to handle object boundaries and occluded pixels (i.e., pixels only seen in one of the views).

Even with all the advances in stereo matching techniques, there is a continual need for more accurate and efficient stereo matching techniques.

SUMMARY

The present symmetric stereo matching technique provides a more accurate technique for handling occlusion by embedding a visibility constraint within an energy minimization framework. By so doing, the present symmetric stereo matching technique treats both images equally, instead of treating one as a reference image. The present symmetric stereo matching technique applies belief propagation in an iterative manner for approximating the minimum energy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 5 is a table illustrating exemplary parameter settings for the symmetric stereo matching techniques of FIGS. 3 and 4; and FIG. 6 illustrates an energy minimization framework in which a visibility constraint is embedded in accordance with the present symmetric stereo matching technique.

DETAILED DESCRIPTION

The following description is directed at a symmetric stereo matching technique for handling occluded pixels. The symmetric stereo matching technique treats both images equally by embedding a visibility constraint within an energy minimization framework. The visibility constraint ensures that the occlusion in one image is consistent with the disparity in the other image. The technique applies an iterative process for approximating the minimum energy using belief propagation. In addition, segmentation may be incorporated as a soft constraint to further enhance the results.

Figure 1:
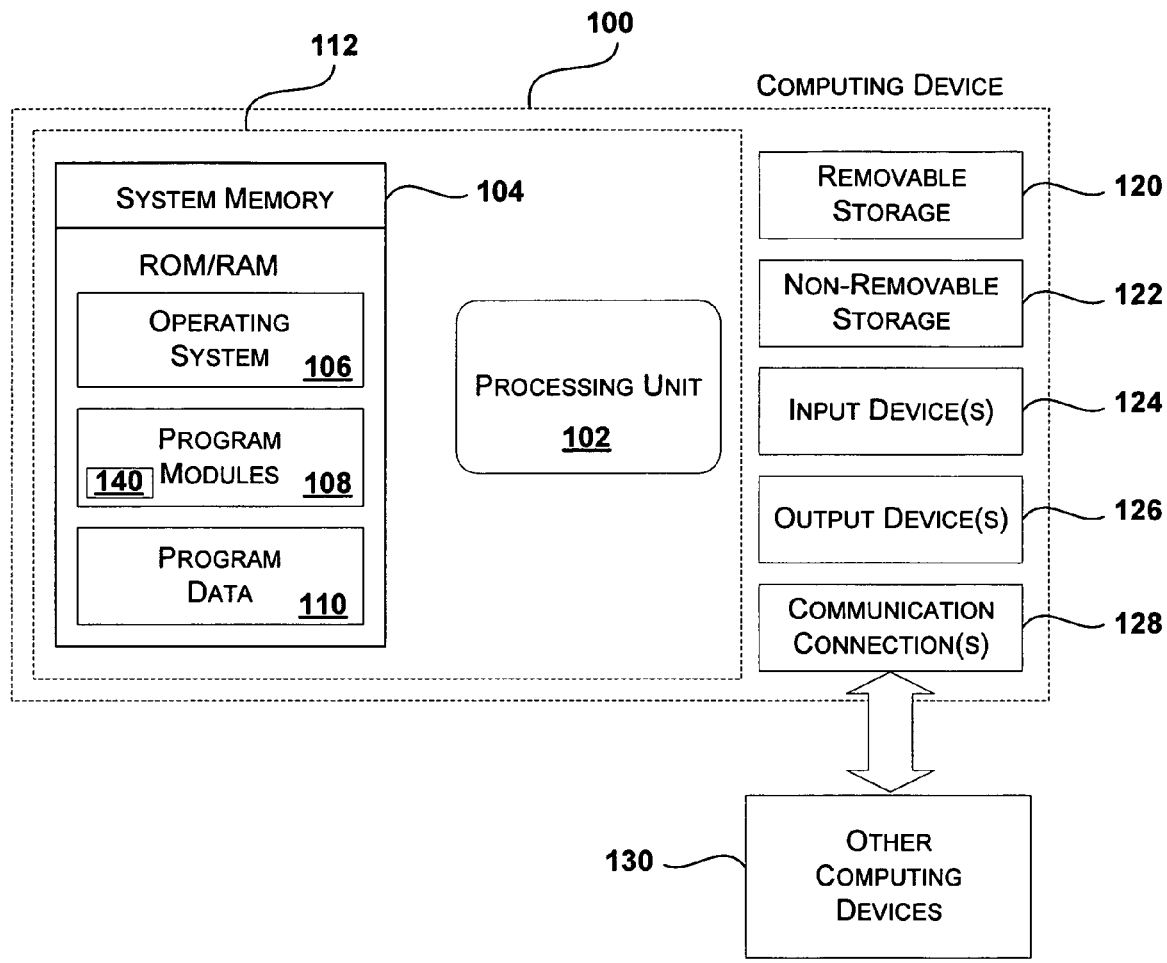
FIG. 1 is an illustrative computing device that may be used to implement the symmetric stereo matching technique described herein.

FIG. 1 is an illustrative computing device that may be used to implement the symmetric stereo matching technique described herein. The system includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 106, one or more program modules 108, and may include program data 110. For the present symmetric stereo matching technique, the program modules 108 may include one or more components 140 for implementing the symmetric stereo matching technique. Alternatively, the operating system 106 may include one or more components for implementing the symmetric stereo matching technique. This basic configuration is illustrated in FIG. 1 by those components within dashed line 112.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 120 and non-removable storage 122. Computer storage media may include volatile and nonvolatile, removable and non-removable media implemented in any method or technology for storage of information, such as computer readable instructions, data structures, program modules, or other data. System memory 104, removable storage 120 and non-removable storage 122 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 124 such as keyboard, mouse, pen, voice input device, touch input device, etc. Output device(s) 126 such as a display, speakers, printer, etc. may also be included. These devices are well know in the art and need not be discussed at length here.

Computing device 100 may also contain communication connections 128 that allow the device to communicate with other computing devices 130, such as over a network. Communication connection(s) 128 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 2:
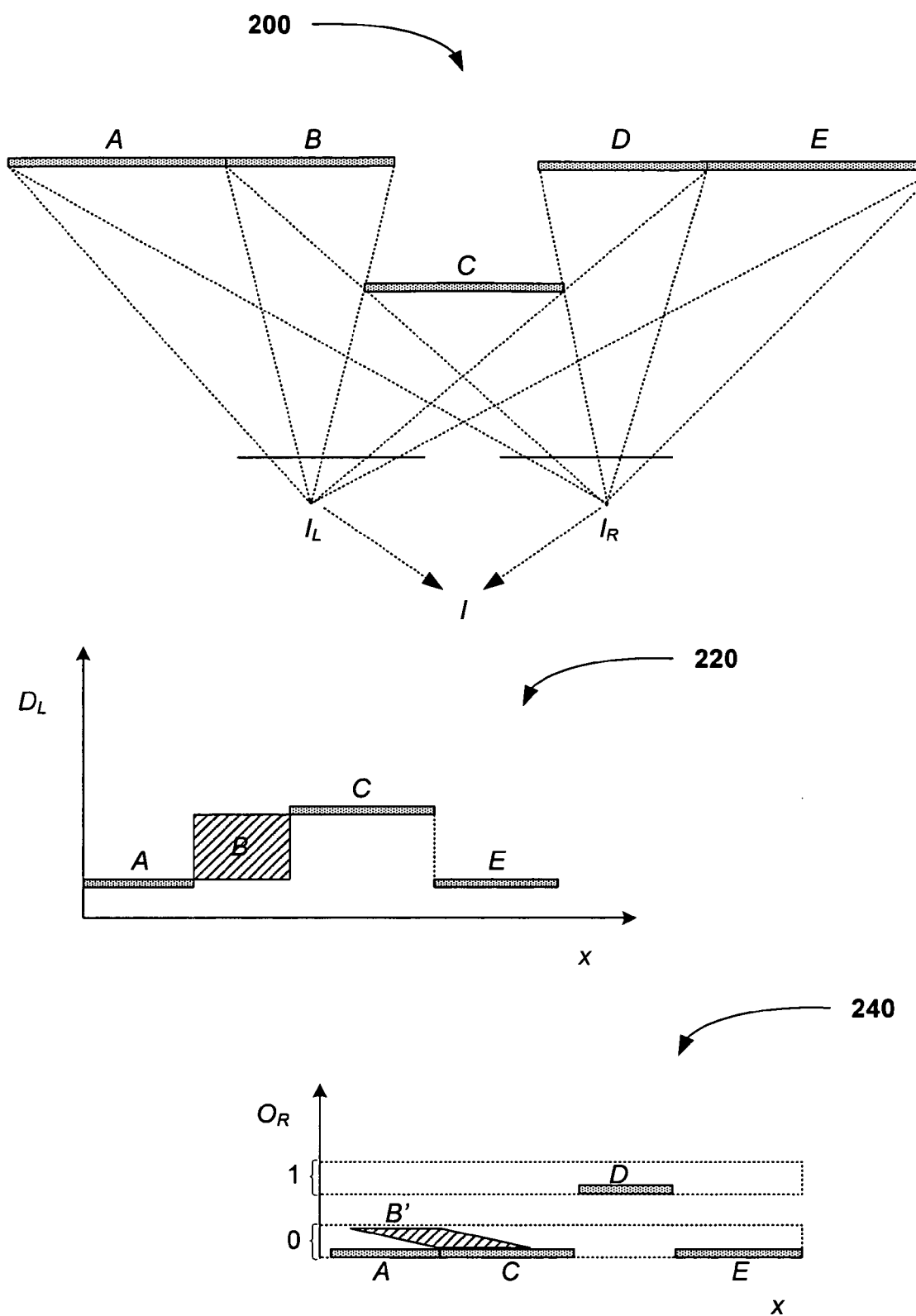
FIG. 2 is a set of illustrations that graphically depict the occlusion reasoning behind the present symmetric stereo matching technique.

FIG. 2 is a set of illustrations 200, 220 and 240 that graphically depict the occlusion reasoning behind the present symmetric stereo matching technique. In the first illustration 200, a stereo image pair $\{I_L \text{ and } I_R\}$ captures a scene that has objects A, B, C, D, and E. The stereo image $I_L$ corresponds to a viewpoint from a left eye and the stereo image $I_R$ corresponds to a viewpoint from a right eye. As illustrated by the dotted lines from each viewpoint to the objects, the left eye viewpoint sees objects A, B, C, and E, and the right eye viewpoint sees objects A, C, D, and E. Thus, object D is occluded from the left eye viewpoint and object B is occluded from the right eye viewpoint. From illustration 200, one can see that object C is closer to the viewpoints than the other objects A, B, D, and E, which are each at the same depth. The present symmetric stereo matching technique attempts to accurately predict the depth for each of these objects, including the occluded objects, based on pixel disparity between the two viewpoints.

Prior techniques focus on using one or both types of hard constraints (i.e., an ordering constraint and a uniqueness constraint) for handling occlusion. The ordering constraint preserves order along scan lines in both input images. The uniqueness constraint enforces a one-to-one mapping between pixels in two images. Unfortunately, applying the ordering and/or uniqueness constraints during stereo matching has limitations. For example, the ordering constraint is enforced for each scan line independently and is violated when scenes contain thin foreground objects or narrow holes. The uniqueness constraint uses a discrete representation of disparity and is not appropriate for scenes containing horizontally slanted surfaces because it results in correspondence between unequal numbers of pixels.

However, as will be described in detail below, the present symmetric stereo matching technique basis its technique on several observations about occluded objects. These observations are expressed in the present symmetric stereo matching technique by enforcing a visibility constraint. As will be shown, the visibility constraint ensures more accurate estimates for the disparity and occlusion information. For two-frame stereo matching, the visibility constraint requires that an occluded pixel does not have a match on the other image and requires that a non-occluded pixel has at least one match on the other image. In comparison with other constraints used for stereo matching, the visibility constraint permits many-to-one matching unlike the one-to-one matching of the uniqueness constraint. In addition, the visibility constraint does not require the ordering constraint to be satisfied. Thus, the visibility constraint is a more flexible constraint, but is also a weaker constraint than the ordering and uniqueness constraints.

As will be shown, the visibility constraint enforces consistency between occlusion in one image and disparity in the other image. While the visibility constraint appears to be quite straightforward, the application of the visibility constraint is nontrivial due to the fact that both the disparity and the occlusions are unknowns. In overview, as will be described below in more detail, the present symmetric stereo matching technique infers a disparity map in one view considering an occlusion map of the other view and infers the occlusion map in one view from the disparity map of the other view in an iterative process. However, before describing the present symmetric stereo matching technique in further detail, the observations on which the technique is based are first described.

The observations that led to the present stereo matching technique are best explained using illustrations 220 and 240 in FIG. 2. Illustration 220 is a disparity map of the left image based on the scene illustrated in illustration 200. The y-axis of the disparity map represents the disparity of the left image and the x-axis represents horizontal distance. One will note that only the objects capable of being seen by the left-eye viewpoint $I_L$ (i.e., objects A, B, C, and E) are represented on the disparity map for the left image. Thus, the occluded object (i.e., object D) is not present on the disparity map for the left image.

The first observation is that if pixels on both sides of a discontinuous boundary are visible by the other view (e.g., the right view when determining the disparity map of the left image) their disparities tend to be unambiguous in the current view. For example, the pixels on both sides of the discontinuity between regions C and E for the left view are visible in the right view. Therefore, the disparities for regions C and E for the left view illustrated in illustration 240 are unambiguous and are set at a specific disparity value along the y-axis. The lines for regions A-E represent a cross-section of a scene observed from above.

The second observation is that disparities in occlusion regions are usually ambiguous. In other words, because disparities are calculated as the difference between the left and right image, if the object is occluded in one image, the disparity can not typically be calculated. For example, because the right image can not see object B, the disparity for region B is ambiguous and will usually be within a range specified by the hatched area in illustration 220.

Based on these observations, it was determined that if the disparity is unambiguous, the occlusion region in the other view can be directly inferred using the visibility constraint. In addition, it was determined that pixels in the ambiguous regions (e.g., region B) will not influence the occlusion reasoning because the regions before and after the ambiguous region have already been matched. Thus, the occlusion reasoning is independent of the disparity for the ambiguous regions.

Illustration 240 is an inferred occlusion map of the right image based on the disparity map of the left image (i.e., illustration 220). The y-axis represents the occlusion in the right image which is a discrete value of either 0 or 1. The x-axis represents the horizontal distance. As mentioned above, object B is occluded from the right viewpoint and object D is occluded from the left viewpoint. Both viewpoints can see objects A, C, and E. Therefore, in the inferred occlusion map of the right image, representations for objects A, C, and E are illustrated with a discrete value of 0 indicating that there was not any occlusion.

The depth discontinuity between object C and E from the left viewpoint causes region D to be within the occlusion region for the right image, even though the right image can see object D. Thus, object D is illustrated with a discrete value of 1 indicating that the object is occluded. Interestingly, region B' associated with object B is shown as a cross-hatch box in illustration 240. The cross-hatch box indicates that a pixel within region B, independent of the resultant disparity within region B', rarely influences the occlusion reasoning. This is true because the neighboring regions (i.e., regions A and C) where the pixel from within B may result after warping have already been matched. For the static scene shown, once the depths of pixels in the image are known, the current locations may be transformed to a new location based on the change in the camera viewpoint. This process of transforming one image to another by shifting pixels is referred to as "warping". Based on this observation, it was determined that occlusion reasoning is independent of the disparity.

Based on these observations, the present stereo matching technique utilizes a visibility constraint which is enforced to estimate disparity and occlusion regions more accurately. The following discussion describes a symmetric stereo model that enforces the visibility constraint via an energy minimization framework and approximates the minimum energy via an iterative process.

Figure 3:
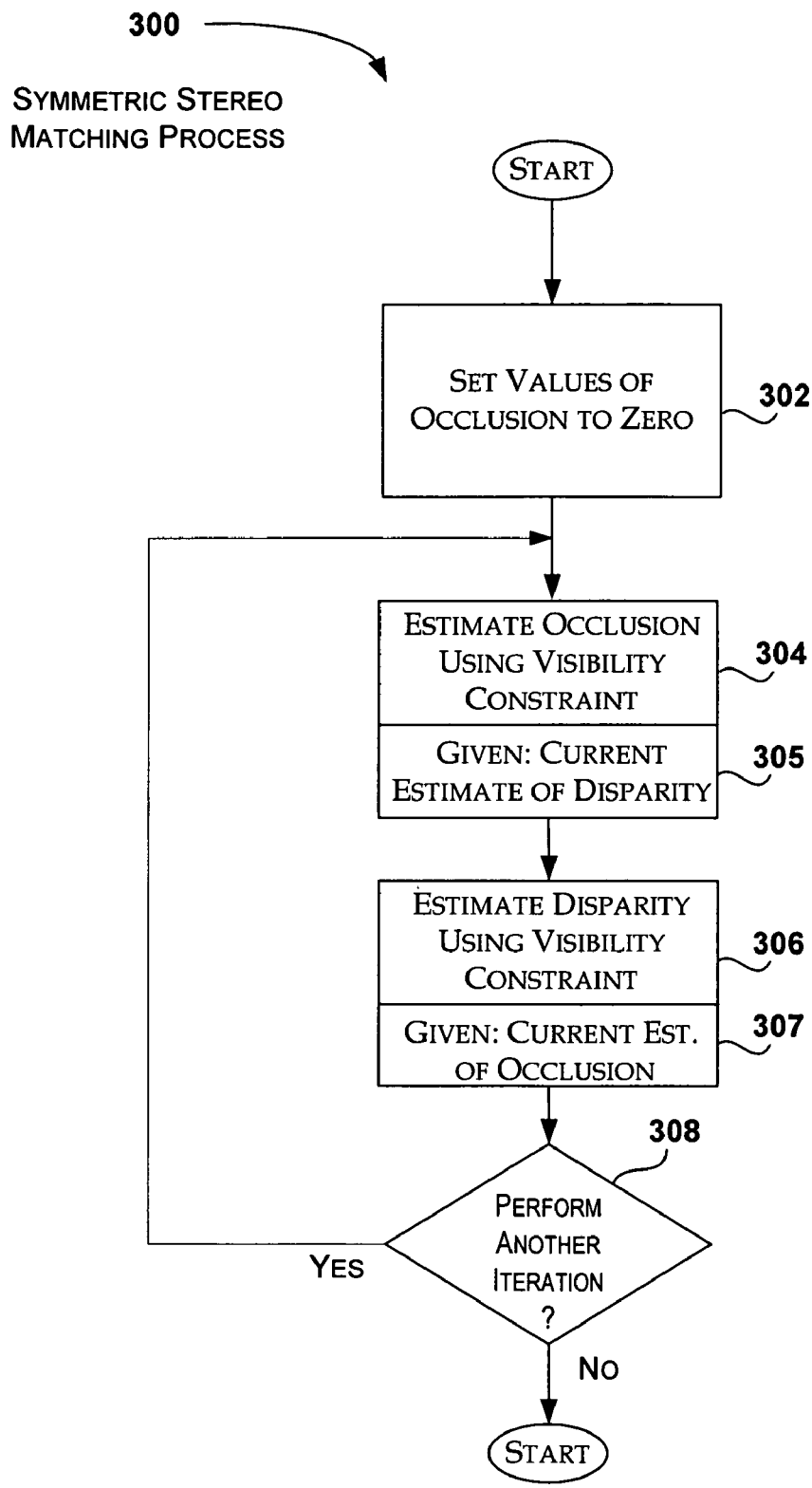
FIG. 3 is flow diagram illustrating an exemplary symmetric stereo matching process using belief propagation in an iterative manner for minimizing the energy of disparity and occlusion.

FIG. 3 is flow diagram illustrating an exemplary symmetric stereo matching process using belief propagation in an iterative manner for minimizing the energy of disparity and occlusion. In overview, the symmetric stereo matching process performs an iterative optimization process to minimize the energy of disparity and occlusion by using belief propagation. Symmetric stereo matching process 300 begins at block 302, where the values for occlusion are set to zero. This ensures that the pixels are initially visible when the iterative process begins. Processing continues at block 304.

At block 304, occlusion is estimated given a current estimate of disparity 305 using the visibility constraint. For the first iteration through block 304, each of the pixels is set to be visible. Block 304 improves the occlusion map using the two observations described above in conjunction with FIG. 2, namely that 1) if pixels on both sides of a discontinuity boundary are visible, disparities tend to be unambiguous and 2) disparities in occlusion regions are usually ambiguous. Processing continues at block 306.

At block 306, disparity is estimated given a current estimate of occlusion 307 using the visibility constraint. Thus, the occlusion estimated in block 304 is used as the current estimate. Block 306 improves the disparity map by enforcing piecewise smoothness while using the occlusion maps for both views as constraints. Processing continues at decision block 308.

At decision block 308, a determination is made whether another iteration of blocks 304 and 306 should be performed. This determination may be based on a pre-defined iteration number. Typically, experimental results show that an iteration of two or three is sufficient to obtain results close to the ground truth. The ground truth refers to the outcome if unknowns were known. Once it is determined that there does not need to be further iterations of blocks 304 and 306, the symmetric stereo matching process is complete.

The basis for the processing performed in blocks 304 and 306 is now further described. Given a stereo image pair I={$I_L$, $I_R$}, block 304 computes the occlusion {$O_L$, $O_R$} and block 306 computes the disparity {$D_L$, $D_R$} for the left view $I_L$ and the right view $I_R$, respectively. For each pixel s, the pixel's disparity $d_s$ is in the range [$d_{min}$, $d_{max}$] and the pixel's occlusion $o_s$ is a binary variable of either 0 or 1 (i.e., $o_s \in \{0,1\}$. In the following discussion, $\hat{D}$ represents disparity in a single view, either left or right. Similarly, $\hat{O}$ represents occlusion in a single view, either left or right.

As mentioned above, most stereo matching techniques only compute the disparity and occlusion in a reference view. In contrast, as will be shown, the present technique computes disparity and occlusion using both views equally and is based on the energy minimization framework formulated for global stereo matching techniques. The energy minimization framework for global stereo matching techniques is as follows:

$$E(D_L;I) = E_d(D_L;I) + E_S(D_L), \quad (1)$$

where the data term $E_d(D_L;I)$ measures how well the disparity $D_L$ fits the given stereo pair I and the smoothness term $E_S(D_L)$ encodes a smoothness assumption on disparity. In these prior techniques, occlusion is either considered implicitly or treated as an outlier process. While equation (1) above computes the disparity of the left image $D_L$, a similar equation computes the disparity of the right image $D_R$, independently. Thus, these prior techniques do not enforce consistency between the two views.

However, in accordance with the present stereo matching technique, the above energy minimization framework needs to support the visibility constraint requirement formulated based on the occlusion reasoning described above in conjunction with FIG. 2. This visibility constraint requirement states that occlusion in one image and disparity in the other image is consistent. Thus, the present technique embeds the visibility constraint within the energy minimization framework by adding two visibility terms: $E_v(O_L; D_R)$ and $E_v(O_R; D_L)$. The term $E_v(O_L; D_R)$ represents the energy determined occlusion in the left image and disparity in the right image. In contrast, the term $E_v(O_R; D_L)$ represents the energy determined by occlusion in the right image and disparity in the left image. Adding the two visibility terms to equation (1) yields the following symmetric stereo energy minimization framework:

$$E(D_L, D_R, O_L, O_R; I) = E_d(D_L, O_L; I) + E_d(D_R, O_R; I) + \quad (2)$$
$$E_S(D_L, O_L) + E_S(D_R, O_R) + E_v(O_L; D_R) + E_v(O_R; D_L).$$

Equation (2) treats the two input images equally due to the symmetric relationship between {$D_L$, $O_L$} and {$D_R$, $O_R$}. Equation (2) can be split into three terms: a data term, a smoothness term, and a visibility term. Each of these terms is now described in further detail.

The data term, $E_d(D_L,O_L;I)+E_d(D_R,O_R;I)$, encodes the intensity consistency of pixel correspondences for hypothesized disparity and occlusion. For a single view, the data term $P(I|\hat{D},\hat{O})$ is defined as:

$$E_d(\hat{D},\hat{O};I) = \sum_{s \notin \hat{O}} \rho_d(F(s,d_s,I)) + \sum_{s \in \hat{O}} \eta_o, \quad (3)$$

where $F(s,d_s,I)$ is the matching cost function of pixel s with disparity $d_s$ given observation I. The term $\rho_d(x)$ is a truncated L1 norm function that is robust to noise or outliers. The term $\rho_d(x)$ is defined as:

$$\rho_d(x) = -\ln((1-e_d)\exp(-|x|/\sigma_d)+e_d), \quad (4)$$

where parameters $\sigma_d$ and $e_d$ control the shape of the robust function. Exemplary values for these parameters are described below in conjunction with Table 500 in FIG. 5. The matching cost is either the intensity difference between two gray pixels or the Euclidean distance between two color pixels. For example, for the left view, the matching cost function is $F(s, d_s, I) = \|I_L(x_s,y_s) - I_R(x_s+d_s, y_s)\|2$, where $(x_s,y_s)$ is the image coordinates of pixel s. The matching cost function for the right view is similarly defined. The cost term $\eta_o$ is the penalty for occlusion labeling. The cost term is necessary to prevent the whole scene from being labeled as an occlusion. An exemplary value for the cost term is provided below in Table 500 of FIG. 5.

The smoothness term, $E_s(D_L,O_L)+E_s(D_R,O_R)$, encodes a piecewise smoothness on the corresponding disparity $\hat{D}$, given occlusion $\hat{O}$. The smoothness term may be abbreviated as $E_s(\hat{D},\hat{O})$. The neighbors of pixel s may be defined as N(s). The set of all adjacent pixel pairs may be defined as $C=\{s, t | s<t, t \in N(s)\}$. Given N(s) and C, the smoothness term on disparity conditioned-on the occlusion is defined as:

$$E_s(\hat{D},\hat{O}) = \sum_{s,t \in C \setminus B} \rho_d(d_s, d_t), \quad (5)$$

where $B=\{(s,t|o_s \neq o_t, s,t \in C\}$ is the set of discontinuities at the boundaries between occluded and non-occluded pixels. This term enforces the smoothness term within occluded and non-occluded regions. The robust function is defined as:

$$\rho_p(d_s,d_t) = \min(\lambda|d_s-d_t|,T) \quad (6)$$

where $\lambda$ is the rate of increase in the cost and T controls the limit of the cost. The above robust function, equation (6), provides two advantages: 1) it preserves discontinuity; and 2) it allows a very efficient implementation of belief propagation to be applied to it in order to minimize the energy involving the smoothness term. The efficient implementation of the belief propagation is described in more detail below after the visibility term is described.

The visibility terms, $E_v(O_L,D_R)$ and $E_v(O_R,D_L)$, enforce the visibility consistency constraint. Each of these two terms is defined in a similar manner. For brevity, the following discussion only explains the visibility term $E_v(O_L,D_R)$. However, given the following discussion, those skilled in the art will appreciate the similarity in defining the $E_v(O_R,D_L)$ term. The visibility term $E_v(O_L,D_R)$ is defined as follows:

$$E_v(O_L, D_R) = \sum_s \beta_w |o_s - W_L(s; D_R)| + \sum_{s,t \in C} \beta_o |o_s - o_t|, \quad (7)$$

where $W_L(s;D_R) \in \{0,1\}$ is a binary map defined on the left image.

For each pixel s, its binary value in $W_L(s;D_R)$ indicates whether or not there exists one or more pixels matching s from the right view according to the disparity $D_R$. The value at pixel s is set to 1 if there is no pixel in the right view corresponding to pixel s. The binary map $W_L(s;D_R)$ can be computed by forward warping all the pixels in the right view using disparity $D_R$. The parameter $\beta_W$ controls the strength of the visibility constraint. The last term in equation (7) enforces the smoothness of the occlusion and is a well-known Ising prior that encourages spatial coherence and helps remove isolated pixels or small holes of the occlusion. The parameter $\beta_o$ controls the strength of the smoothness.

The present symmetric stereo matching model is based on the combination of equations (3), (5), and (7). Based on this model and other observations, it was found that stereo matching may be performed through an iterative optimization process using belief propagation. The reasoning that led to the use of belief propagation is described below. However, before describing the reasoning, the present discussion briefly provides some background on the use of belief propagation.

A Markov network is an undirected graph. For a graph with node s=1, ..., N, the state of each node is denoted by $x_s$. Each hidden node is connected with an observed node $y_s$. The Gibbs energy of this pair-wise Markov network is commonly defined as:

$$E(X;Y) = \sum_s \phi_s(x_s, y_s) + \sum_{s,t,s<t} \varphi_{s,t}(x_s, x_t), \quad (8)$$

where $\phi_s(.)$ is the local evidence for node s and $\phi_{s,t}(.)$ is the compatibility function between node s and t. Recent empirical results show that belief propagation yields very good approximations for the above Gibbs energy equation (8).

The reasoning that led to the technique of estimating occlusion and disparity in an iterative manner using belief propagation is now described. First, the reasoning for estimating occlusion given a current disparity is described. As explained above, equation (2) represents the present symmetric stereo model that applies the visibility constraint. If the current estimated disparity is given as $\{D_L, D_R\}$, the energy of equation (2) can be written as the sum of two functions with respect of occlusion $O_L$ and $O_R$ as follows:

$$E(D_L,D_R,O_L,O_R;I) = E_{O_L} + E_{O_R} \quad (9)$$

where $E_{O_L} = E_d(D_L,O_L; I) + E_s(D_L;O_L) + E_v(O_L; D_R)$ and $E_{O_R} = E_d(D_R,O_R; I) + E_s(D_R,O_R) + E_v(O_R; D_L)$. Then, the occlusion $\{O_L, O_R\}$ may be computed as follows:

$$O_L^* = \underset{O_L}{\arg\min} E_{O_L}, \quad (10)$$

$$O_R^* = \underset{O_R}{\arg\min} E_{O_R}.$$

Because occlusions are binary variables, $E_d(D_L,O_L; I)$ may be rewritten as follows:

$$E_d(D_L O_L; I) = \sum_s ((1-o_s)\rho_d(F(s, d_s, I)) + o_s \eta_o). \quad (11)$$

The term $E_S(D_L, O_L)$ associated with equation (9) may be ignored because the disparity of a pixel in the occluded region is not recoverable. While an arbitrary guess of the disparity may be made, the result may be worse than just ignoring the term. Furthermore, the difference in disparity between adjacent pixels is weak evidence for occlusion.

Finally, by combining the visibility term from equation (7) and the data term $E_d(D_L, O_L; I)$ from (11) for $E_{O_L}$, the equation for estimating occlusion in the left view is as follows:

$$E_{O_L} \approx \sum_s ((1-o_s)\rho_d(F(s, d_s, I)) + o_s \eta_o) + \quad (12)$$
$$\sum_s \beta_w |o_s - W_L(s; D_R)| + \sum_{s,t \in C} \beta_o |o_s - o_t|.$$

One will appreciate that the first two terms on the right hand side of equation (12) may be viewed as an evidence $o_s^o(.)$ and the last term may be viewed as a compatibility function $\phi_{st}^o(.)$. Therefore, it was determined that equation (12) represents the Gibbs energy of a Markov network that is defined by evidence $o_s^o(.)$ and compatibility $\phi_{st}^o(.)$. As a result, it was determined that the max-product version of belief propagation may be applied to minimize equation (12). While the above discussion describes the reasoning for the energy with respect to $O_L$, the same reasoning may be applied to find the estimated energy with respect to $O_R$. Thus, the max-product version of belief propagation may be applied to minimize both $E_{O_L}$ and $E_{O_R}$.

Now, the following discussion describes the reasoning for estimating disparity given a current occlusion. This time, the current estimation of occlusion. $\{O_L, O_R\}$ is a given. Because the present process 300 shown in FIG. 3 is an iterative process, the current estimate for occlusion is the estimate calculated by using the max-product version of belief propagation as described above. The energy of equation (2) can then be written as the sum of two functions with respect of disparity $D_L$ and $D_R$ as follows:

$$E(D_L, D_R, O_L, O_R; I) = E_{D_L} + E_{D_R} \quad (13)$$

where $E_{D_L} = E_d(D_L, O_L; I) + E_S(D_L, O_L) + E_v(O_R; D_L)$ and $E_{D_R} = E_d(D_R, O_R; I) + E_S(D_R, O_R) + E_v(O_L; D_R)$. Then, the disparity $\{D_L, D_R\}$ may be estimated by minimizing $E_{D_L}$ and $E_{D_R}$ as follows:

$$D_L^* = \underset{D_L}{\arg\min}\, E_{D_L}, \quad (14)$$
$$D_R^* = \underset{D_R}{\arg\min}\, E_{D_R}.$$

The visibility term $E_v(O_R; D_L)$ encodes the visibility constraint. The visibility constraint then imposes two types of constraints on the disparity $D_L$ given the occlusion $O_R$. The first constraint is that for each pixel s in the left image, the pixel should not match the occluded pixels in the right image. In other words, the disparity $d_s$ for pixel s may be restricted such that $O_R(x_s + d_s, y_s) = 0$. It was determined that this restriction $d_s$ was a local constraint and could be easily encoded.

The second constraint is that for each non-occluded pixel in the right image there should be at least one pixel in the left image that matches. This constraint is a global constraint on disparities of all pixels in the left image. It was determined that this constraint could be implicitly enforced in a matching process.

Based on these two constraints, the visibility term $E_v(O_R; D_L)$ may be approximated by considering only the local constraint as follows:

$$E_v(O_R, D_L) \approx \sum_s \beta_w O_R(x_s + d_s, y_s), \quad (15)$$

where $O_R(x_{s+ds}, y_s)$ indicates whether or not the corresponding pixel of s is occluded, given the disparity $d_s$. Therefore, by combining equations (3), (5), and (15), the estimated disparity for the left view is as follows:

$$E_{D_L} \approx \sum_{s \notin \hat{O}} \rho_d(F(s, d_s, I)) + \sum_s \beta_w O_R(x_s + d_s, y_s) + \sum_{s,t \in C \backslash B} \rho_d(d_s, d_t). \quad (16)$$

Again, one will appreciate that the first two terms on the right hand side of equation (16) may be viewed as an evidence $o_s^d(.)$ and the last term may be viewed as a compatibility function $\phi_{st}^d(.)$. It was determined that equation (16) may also be interpreted as the Gibbs energy of a Markov network with respect to occlusion. While the above discussion describes the reasoning for the energy with respect to $D_L$, the same reasoning may be applied to find the estimated energy with respect to $D_R$. Thus, the max-product version of belief propagation may be applied to minimize both $E_{D_L}$ and $E_{D_R}$ given a current estimate of occlusion.

Thus, block 304 in FIG. 3 may estimate occlusion $\{O_L, O_R\}$ using equation (12), given a current estimation of disparity $\{D_L, D_R\}$ 305. Block 306 may estimate disparity $\{D_L, D_R\}$ using equation (16), given a current estimate of occlusion $\{O_L, O_R\}$ 307. In each case, equations (12) and (16) may be approximated using belief propagation.

Figure 4:
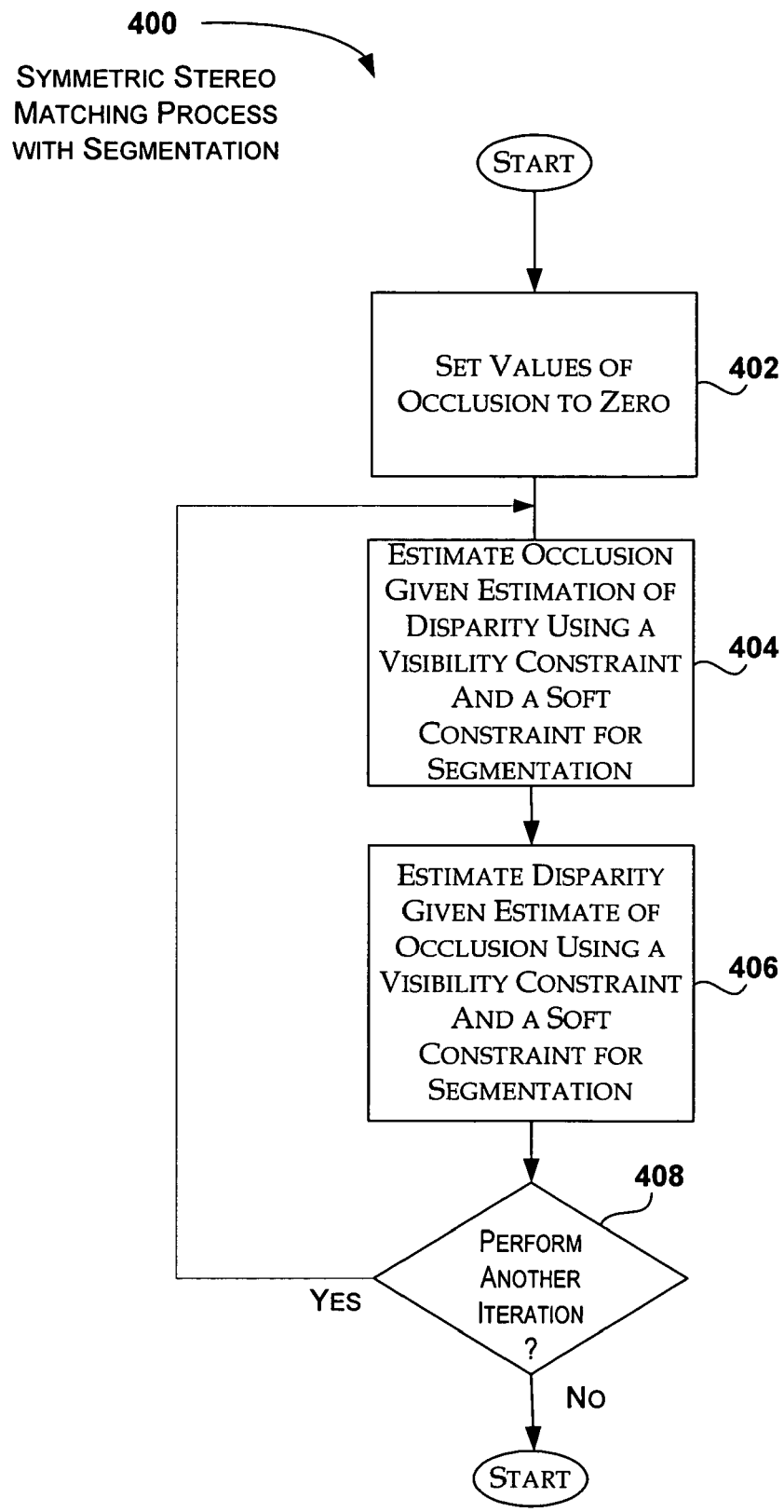
FIG. 4 is a flow diagram illustrating another exemplary symmetric stereo matching process using segmentation as a soft constraint when performing the belief propagation in an iterative manner for minimizing the energy of disparity and occlusion.

FIG. 4 is a flow diagram illustrating another exemplary symmetric stereo matching process using segmentation as a soft constraint when performing belief propagation for minimizing the energy of disparity and occlusion. Segmentation-based stereo approaches have demonstrated that the difficulties and ambiguities caused by texture-less surfaces and/or occlusion can be handled using groups of pixels with similar colors. Such prior approaches assume that there are no large discontinuities within each segment. For the following discussion, this assumption is referred to as the "segment constraint."

The present symmetric stereo matching technique exploits the segment constraint by incorporating a soft constraint within the stereo model of equation (3). The stereo model then becomes as follows:

$$E_d(\hat{D}, \hat{O}; I) = \quad (17)$$
$$\sum_{s \notin \hat{O}} \rho_d(F(s, d_s, I)) + \sum_{s \in \hat{O}} \eta_o + \sum_s \gamma |d_s - (a_s x_s + b_s y_s + c_s)|,$$

where $\gamma$ controls the strength of the segment constraint and $[a_s, b_s, c_s]$ are the three dimensional (3D) plane parameters for the segment containing pixel s. The 3D plane parameters for each region may be estimated by any one of several well known robust fitting algorithms.

Blocks 304 and 306 in FIG. 3 correspond to blocks 404 and 406, respectively. However, blocks 404 and 406 each incorporate the soft constraint for segmentation as defined by the last term in equation (17) when estimating the disparity and occlusion, respectively. In contrast with prior segmentation-based approaches, the present technique does not commit to an initial segmentation result prior to 3D plane fitting and stereo processing. It was determined that doing so resulted in errors that could not be easily undone and were then propagated to the stereo matching stage. Instead, the present technique applies the segment constraint as a soft constraint, as shown in equation (17). The technique may ignore regions that are too small (e.g., <500 visible pixels) and still obtain reliable 3D plane parameter estimations.

FIG. 5 is a table illustrating exemplary parameter settings for the symmetric stereo matching processes shown in FIGS. 3 and 4. Each of the parameters, except $\lambda$, is shown with an exemplary value that may be used to yield good results. It was determined that the smoothness strength $\lambda$ parameter was sensitive to variations between neighboring pixels. Therefore, the present symmetric stereo matching technique may set this parameter automatically. The reasoning behind the technique for automatically setting the smoothness strength $\lambda$ parameter is now described.

First, if the similarity of the data terms (matching distributions) between two neighboring pixels is high, it was determined that the smoothness strength $\lambda$ should be large to encourage the propagations between them. The matching distribution for a pixel s is measured by $p_s(d_s) \propto \exp(-F(s,ds,I))$. The similarity between two neighboring pixels $p_s$ and $p_t$ can be measured with a symmetric version of the Kullback-Lieber (KL) divergence. The Kullback-Lieber divergence is shown below:

$$KL(p_s \| p_t) = \Sigma_i (p_s^i - p_t^i)(\log(p_s^i) - \log(p_t^i)). \qquad (18)$$

The average KL divergence $\overline{KL}$ is computed over the entire image. Using the ground truth depth for the known Tsukuba data, a multiplicative constant a may be estimated such that $\lambda = \alpha \overline{KL}$, where a may be set to 5.75 to achieve good results. By using the adaptive approach for estimating the value for the smoothness strength $\lambda$, the present symmetric stereo matching technique approach has consistently provided better results than other known techniques given the example data sets.

FIG. 6 illustrates an energy minimization framework 600 in which a visibility constraint 602 is embedded in accordance with the present symmetric stereo matching technique as shown in equation (2) above. The minimum energy for occlusion 620 and minimum energy for disparity 630 may be estimated using belief propagation as described above for each view in conjunction with equations (12) and (16), respectively.

As described, the present symmetric stereo matching technique incorporates a visibility constraint to handle occlusion. The visibility constraint is a general constraint that allows the present technique the ability to correctly recover horizontally slanted surfaces, thin foreground objects, and other difficult scenes. The technique may also be further enhanced by incorporating a soft segment constraint and automatic parameter estimation to achieve even better results.

While example embodiments and applications have been illustrated and described, it is to be understood that the invention is not limited to the precise configurations and resources described above. Various modifications, changes, and variations apparent to those skilled in the art may be made in the arrangement, operation, and details of the disclosed embodiments herein without departing from the scope of the claimed invention.

What is claimed is:

1. A computing device, comprising:
a processor;
a memory into which a plurality of instructions are loaded, the plurality of instructions performing a method when executed by the processor, the method comprising:
iteratively estimating a minimum energy for both occlusion and disparity for at least two views of an image using belief propagation, wherein the minimum energy is based on an energy minimization framework in which a visibility constraint is embedded, wherein a smoothness strength parameter within the energy minimization framework is automatically set based on a similarity between each data term for neighboring pixels in the energy minimization framework, wherein the similarity between neighboring pixels is measured with a symmetric version of a Kullback-Lieber divergence and the average is computed over the entire image.

2. The computing device of claim 1, wherein the visibility constraint ensures that occlusion in one view and disparity in the other views are consistent.

3. The computing device of claim 1, wherein the at least two views comprise a left view and a right view for a two-frame stereo image.

4. The computing device of claim 1, wherein the belief propagation comprises a max-product version of belief propagation.

5. The computing device of claim 1, wherein the energy minimization framework further comprises a soft constraint for handling segmentation.

6. The computing device of claim 1, wherein the smoothness strength parameter is estimated by multiplying a constant by the average Kullback-Lieber divergence.

7. The computing device of claim 6, wherein the constant comprises a value of 5.75.

8. The computing device of claim 1, wherein iteratively estimating the disparity and the occlusion concludes upon a pre-defined iteration number.

9. The computing device of claim 3, wherein the visibility constraint ensures that an occluded pixel in the right view does not have a match in the left view and that a non-occluded pixel in the right view has at least one match in the left view.

10. A computer-implemented method comprising:
storing, in a memory, instructions for performing the method;
executing the instructions on a processor;
according to the instruction being executed:
iteratively estimating a minimum energy for both occlusion and disparity for at least two views of an image using belief propagation, wherein the minimum energy is based on an energy minimization framework in which a visibility constraint is embedded, wherein a smoothness strength parameter within the energy minimization framework is automatically set based on a similarity between each data term for neighboring pixels in the energy minimization framework, wherein the similarity between neighboring pixels is measured with a symmetric version of a Kullback-Lieber divergence and the average is computed over the entire image.

11. The computer-implemented method of claim 10, wherein the visibility constraint ensures that occlusion in one view and disparity in the other views are consistent.

12. The computer-implemented method of claim 10, wherein the at least two views comprise a left view and a right view for a two-frame stereo image.

13. The computer-implemented method of claim 10, wherein the belief propagation comprises a max-product version of belief propagation.

14. The computer-implemented method of claim 10, wherein the energy minimization framework further comprises a soft constraint for handling segmentation.

15. The computer-implemented method of claim 10, wherein the smoothness strength parameter is estimated by multiplying a constant by the average Kullback-Lieber divergence.

16. The computer-implemented method of claim 15, wherein the constant comprises a value of 5.75.

17. The computer-implemented method of claim 10, wherein iteratively estimating the disparity and the occlusion concludes upon a pre-defined iteration number.

18. The computer-implemented method of claim 12, wherein the visibility constraint ensures that an occluded pixel in the right view does not have a match in the left view and that a non-occluded pixel in the right view has at least one match in the left view.

* * * * *